US012587308B2

(12) United States Patent
Onishi et al.

(10) Patent No.: US 12,587,308 B2
(45) Date of Patent: Mar. 24, 2026

(54) CONTROL APPARATUS AND METHOD THEREOF FOR ADAPTING DOWNLINK OR UPLINK TRANSMISSION PARAMETERS TO RADIO LINK CONDITION

(71) Applicant: NEC Corporation, Tokyo (JP)

(72) Inventors: Takeo Onishi, Tokyo (JP); Eiji Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 338 days.

(21) Appl. No.: 18/200,919

(22) Filed: May 23, 2023

(65) Prior Publication Data

US 2023/0412303 A1      Dec. 21, 2023

(30) Foreign Application Priority Data

May 30, 2022   (JP) ................................. 2022-087497

(51) Int. Cl.
*H04L 1/00*         (2006.01)
*H04L 1/20*         (2006.01)

(52) U.S. Cl.
CPC .......... *H04L 1/0026* (2013.01); *H04L 1/0003* (2013.01); *H04L 1/203* (2013.01)

(58) Field of Classification Search
CPC ... H04L 1/0003; H04L 1/0009; H04L 1/0019; H04L 1/0026; H04L 1/203
See application file for complete search history.

(56) References Cited

U.S. PATENT DOCUMENTS

2016/0157118 A1* 6/2016 Liu ........................ H04L 1/0003
                                                         370/252
2017/0142696 A1* 5/2017 Kim ....................... H04L 1/0009

2019/0335423 A1* 10/2019 Wu .................... H04W 72/0453
2021/0184787 A1* 6/2021 Iwabuchi .............. H04L 1/0017
2021/0344440 A1* 11/2021 Yoshioka .............. H04L 1/1896
2022/0191881 A1* 6/2022 Fan ........................ H04L 1/0019
2023/0198702 A1* 6/2023 Kim .................... H04L 27/2601
                                                         370/329
2023/0412303 A1* 12/2023 Onishi ................... H04L 1/203

FOREIGN PATENT DOCUMENTS

| JP | 2011-188049 A | 9/2011 |
|----|---------------|--------|
| JP | 2020-506622 A | 2/2020 |
| WO | 2019/049212 A1 | 3/2019 |
| WO | 2020/031357 A1 | 2/2020 |

OTHER PUBLICATIONS

"Adaptive Modulation and Coding based on Reinforcement Learning for 5G Networks"; Mota et al.; 2019 IEEE Globecom Workshops (GC Wkshps); (Year: 2019).*
JP Office Action for JP Application No. 2022-087497, mailed on Feb. 17, 2026 with English Translation.

* cited by examiner

*Primary Examiner* — Benjamin H Elliott, IV

(74) *Attorney, Agent, or Firm* — Sughrue Mion, PLLC

(57)                     ABSTRACT

A control apparatus predicts a probability distribution of radio quality when a downlink transmission from a base station to a radio terminal or an uplink transmission from a radio terminal to a base station is to be performed. The control apparatus calculates an expected value of a block error rate or reliability in the downlink or uplink transmission using the predicted probability distribution. The control apparatus determines a value of each of one or more parameters related to the downlink or uplink transmission, taking into account the calculated expected value.

16 Claims, 9 Drawing Sheets

Obtain BLER or reliability requirement and delay requirement     ⌐301

Determine respective values of one or more parameters to satisfy both BLER or reliability requirement and delay requirement     ⌐302

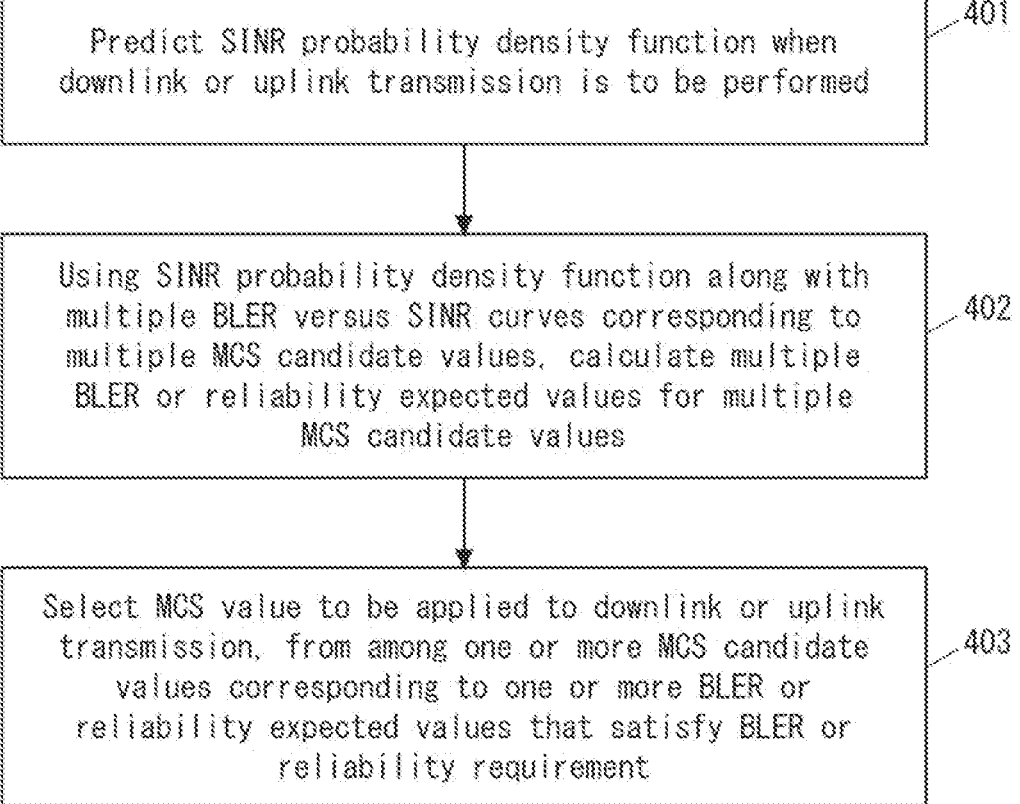

Predict SINR probability density function when downlink or uplink transmission is to be performed 401

Using SINR probability density function along with multiple BLER versus SINR curves corresponding to multiple MCS candidate values, calculate multiple BLER or reliability expected values for multiple MCS candidate values 402

Select MCS value to be applied to downlink or uplink transmission, from among one or more MCS candidate values corresponding to one or more BLER or reliability expected values that satisfy BLER or reliability requirement 403

Fig. 4

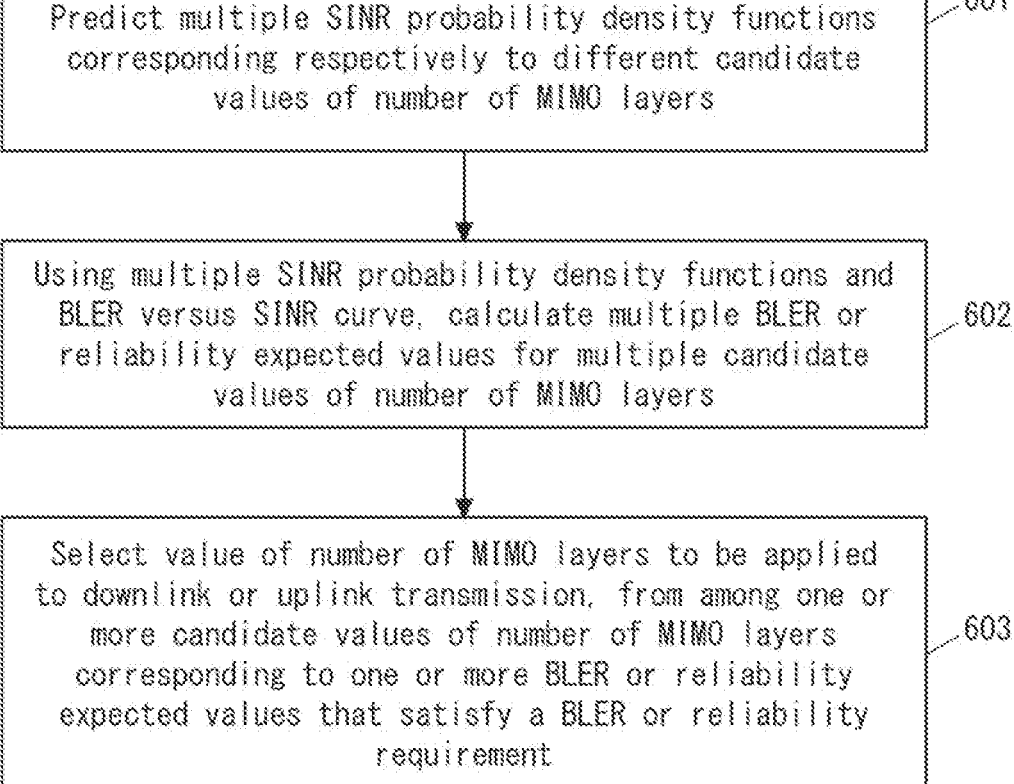

Predict multiple SINR probability density functions corresponding respectively to different candidate values of number of MIMO layers ⟋601

Using multiple SINR probability density functions and BLER versus SINR curve, calculate multiple BLER or reliability expected values for multiple candidate values of number of MIMO layers ⟋602

Select value of number of MIMO layers to be applied to downlink or uplink transmission, from among one or more candidate values of number of MIMO layers corresponding to one or more BLER or reliability expected values that satisfy a BLER or reliability requirement ⟋603

Fig. 6

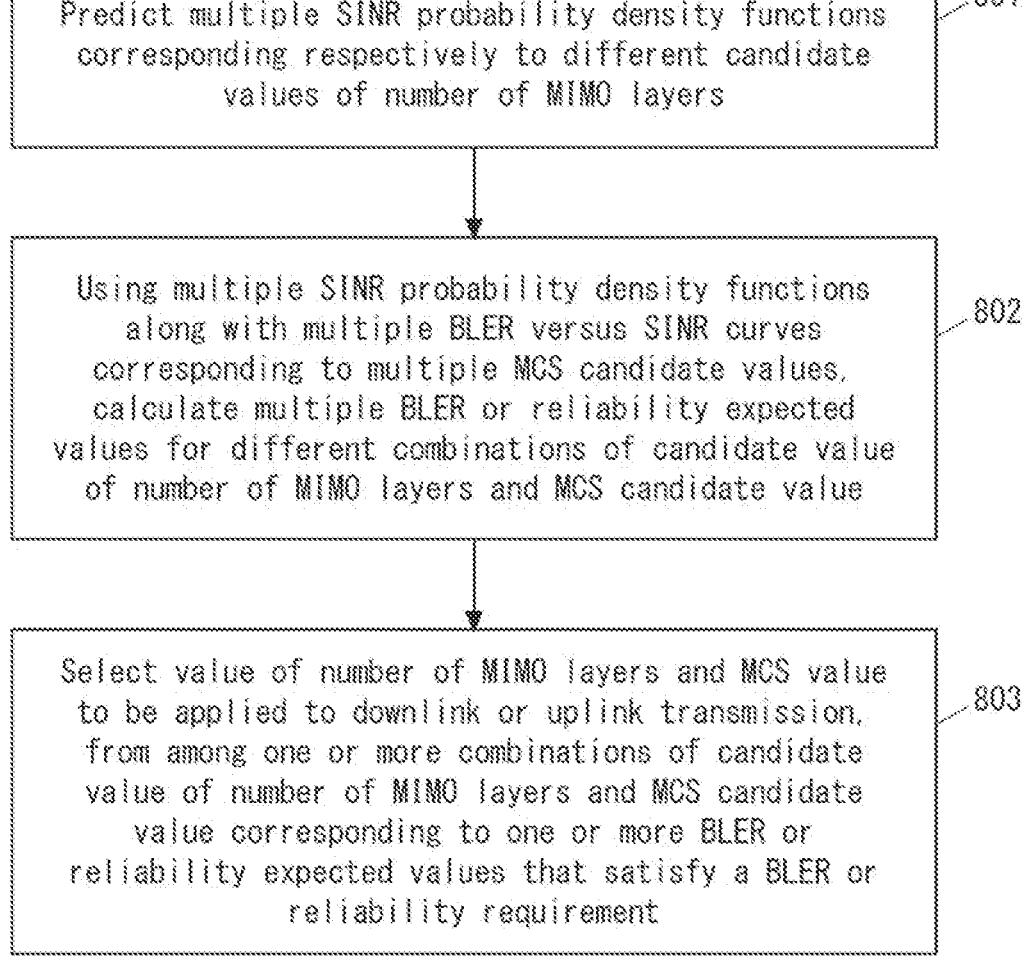

Predict multiple SINR probability density functions corresponding respectively to different candidate values of number of MIMO layers
801

Using multiple SINR probability density functions along with multiple BLER versus SINR curves corresponding to multiple MCS candidate values, calculate multiple BLER or reliability expected values for different combinations of candidate value of number of MIMO layers and MCS candidate value
802

Select value of number of MIMO layers and MCS value to be applied to downlink or uplink transmission, from among one or more combinations of candidate value of number of MIMO layers and MCS candidate value corresponding to one or more BLER or reliability expected values that satisfy a BLER or reliability requirement
803

Fig. 8

CONTROL APPARATUS AND METHOD THEREOF FOR ADAPTING DOWNLINK OR UPLINK TRANSMISSION PARAMETERS TO RADIO LINK CONDITION

INCORPORATION BY REFERENCE

This application is based upon and claims the benefit of priority from Japanese patent application No. 2022-087497, filed on May 30, 2022, the disclosure of which is incorporated herein in its entirety by reference.

TECHNICAL FIELD

The present disclosure relates to radio communication systems, and in particular to the determination of parameters related to radio communication.

BACKGROUND ART

Patent Literature 1 describes the selection of an MCS index by a transmitter. The transmitter determines a first candidate Modulation and Coding Scheme (MCS) value MCS_A and a second candidate value MCS_B. MCS_A is an MCS index determined based on channel quality between the transmitter and a receiver and satisfying a target Block Error Rate (BLER) in the channel between the transmitter and the receiver. The channel quality is, for example, signal to interference plus noise ratio (SINR), signal to noise ratio (SNR), or signal to interference ratio (SIR). On the other hand, MCS_B is determined so that the number of packet divisions used to divide data to be transmitted into multiple transport blocks is less than or equal to the number allowed based on a delay requirement (e.g., delay allowable time). Then, the transmitter sets the range with MCS_A as the upper limit and MCS_B as the lower limit as the selection range of MCS indexes, and selects any one MCS index from the configured selection range. This reduces the delay caused by the division of a transmitted data packet and guarantees low latency. The transmitter is a base station (e.g., eNB or gNB) in the case of downlink and a radio terminal (e.g., User Equipment (UE)) in the case of uplink. The receiver is a radio terminal in the downlink case and a base station in the uplink case.

Patent Literature 2 discloses selective use of first and second MCS tables by a base station (e.g., gNB) and a radio terminal (e.g., UE). Each MCS table associates multiple MCS indices with different combinations of modulation order and code rate. The minimum code rate (e.g., 30) specified in the second MCS table is less than the minimum code rate (e.g., 120) specified in the first MCS table. The base station indicates to the radio terminal, using Radio Resource Control (RRC) signaling or Downlink Control Information (DCI), the MCS table to be used for one or both downlink reception and uplink transmission. In one example, the second MCS table may be used for cases where low latency and high reliability are required.

PATENT LITERATURE

Patent Literature 1: WO 2019/049212 A1
Patent Literature 2: WO 2020/031357 A1

SUMMARY

In downlink transmission in a radio system such as a Long Term Evolution (LTE) system and a 5th Generation (5G)

system, a base station (e.g., eNB or gNB) determines an MCS for downlink transmission based on a Chanel State Information (CSI) report received from a radio terminal (e.g., UE). However, there is a delay (e.g., several tens of ms) between when the radio terminal measures the reception quality (e.g., SINR) of a CSI-related reference signal (e.g., CSI-reference signal (CSI-RS)) and when the base station determines the MCS based on the CSI report. In addition, errors can occur in the measurement of the CSI-related reference signal by the radio terminal. Because of these factors, the radio quality (or channel state) when the downlink transmission takes place may be different from that when the radio terminal measured the CSI-related reference signal. This difference may lead to a situation where a radio parameter (e.g., MCS) selected or determined based on the measured results of the radio quality (or channel state) may not achieve the target communication quality (e.g., target BLER). Patent Literature 1 and 2 do not provide a solution to the above problem.

An example object to be attained by example embodiments disclosed herein is to provide an apparatus, a method, and a program that contribute to improving a likelihood that a radio parameter (e.g., MCS) selected or determined based on a measurement result of radio quality can achieve a target communication quality (e.g., target BLER). It should be noted that this object is merely one of the objects to be attained by the example embodiments disclosed herein. Other objects or problems and novel features will be made apparent from the following description and the accompanying drawings.

In a first aspect, a control apparatus at least one memory and at least one processor coupled to the at least one memory. The at least one processor is configured to predict a probability distribution of radio quality when a downlink transmission from a base station to a radio terminal or an uplink transmission from a radio terminal to a base station is to be performed. The at least one processor is configured to calculate an expected value of a block error rate (BLER) or reliability in the downlink or uplink transmission using the probability distribution. The at least one processor is further configured to determine a value of each of one or more parameters related to the downlink or uplink transmission, taking into account the expected value.

In a second aspect, a method performed by a control apparatus includes the following steps:

(a) predicting a probability distribution of radio quality when a downlink transmission from a base station to a radio terminal or an uplink transmission from a radio terminal to a base station is to be performed;

(b) calculating an expected value of a block error rate (BLER) or reliability in the downlink or uplink transmission using the probability distribution; and (c) determining a value of each of one or more parameters related to the downlink or uplink transmission, taking into account the expected value.

In a third aspect, a program includes instructions (software codes) that, when loaded into a computer, cause the computer to perform the method according to the above-described second aspect.

BRIEF DESCRIPTION OF DRAWINGS

The above and other aspects, features, and advantages of the present invention will become more apparent from the following description of certain example embodiments when taken in conjunction with the accompanying drawings, in which:

FIG. 4 is a flowchart showing an example of an operation of a control apparatus according to an example embodiment;

FIG. 6 is a flowchart showing an example of an operation of a control apparatus according to an example embodiment;

FIG. 8 is a flowchart showing an example of an operation of a control apparatus according to an example embodiment;

EXAMPLE EMBODIMENT

Specific example embodiments will be described hereinafter in detail with reference to the drawings. The same or corresponding elements are denoted by the same symbols throughout the drawings, and duplicated explanations are omitted as necessary for the sake of clarity.

Each of the example embodiments described below may be used individually, or two or more of the example embodiments may be combined with one another as appropriate. These example embodiments include novel features different from each other. Accordingly, these example embodiments contribute to attaining objects or solving problems different from one another and also contribute to obtaining advantages different from one another.

The following descriptions on the example embodiments mainly focus on the 3GPP Long Term Evolution (LTE) system and fifth generation mobile communication system (5G system). However, these example embodiments may be applied to other radio communication systems.

As used in this specification, "if" may be interpreted as meaning "when", "at or around the time", "after", "upon", "in response to determining", "in accordance with a determination", or "in response to detecting", depending on the context. These expressions may be interpreted to mean the same thing, depending on the context.

Figure 1:
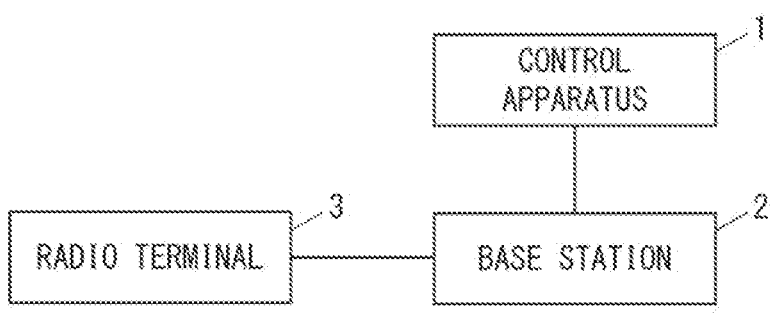
FIG. 1 is a diagram showing an example configuration of a radio communication system according to an example embodiment.

At first, the configuration of a radio communication system that is common to a plurality of example embodiments is described. FIG. 1 shows an example configuration of a radio communication system for a plurality of example embodiments. In the example of FIG. 1, the radio communication system includes a control apparatus 1, a base station 2, and a radio terminal 3. The base station 2 may be referred to as an eNB, gNB, radio station, radio access network node, or radio access point. The radio terminal 3 may be referred to as a User Equipment (UE), user terminal, or radio transceiver device. Each element (network function) shown in FIG. 1 can be implemented, for example, as a network element on dedicated hardware, as a software instance running on dedicated hardware, or as a virtualized function instantiated on an application platform.

The base station 2 communicates with the radio terminal 3 via an air interface. The base station 2 transmits downlink signals to the radio terminal 3 and receives uplink signals from the radio terminal 3. The base station 2 may communicate with multiple radio terminals simultaneously, including the radio terminal 3. The radio terminal 3 may communicate with multiple base stations simultaneously, including the base station 2. The radio terminal 3 or the radio terminal 3 and base station 2 may be applied to industrial applications, such as manufacturing facilities, transportation systems, and logistics systems. For example, the radio terminal 3 may be implemented in a manufacturing robot, an automated guided vehicle (AGV), or a construction machine, or in other devices used in cities, buildings, transportation networks, and public infrastructures.

The base station 2 may include a Central Unit (CU) and one or more Distributed Units (DUs). The CU may include a CU Control Plane (CU-CP) Unit and one or more CU User Plane (CU-UP) Units. In some implementations, the CU may host RRC functions, Service Data Adaptation Protocol (SDAP) layer functions, and Packet Data Convergence Protocol (PDCP) layer functions. Meanwhile, the DU may host Radio Link Control (RLC) Layer functions, Medium Access Control (MAC) Layer functions, and part or all Physical (PHY) Layer functions. The base station 2 may also include one or more Radio Units (RUs) responsible for some physical layer or Layer 1 (e.g., Low PHY) signal processes and for Radio Frequency (RF) signal processes.

The control apparatus 1 provides control and optimization of the base station 2 and resources through data collection and actions on a control interface. The control interface may be, for example, an Open Radio Access Network (O-RAN) E2 interface. The control apparatus 1 may be a Radio Access Network (RAN) Intelligent Controller (RIC) or may be integrated into the RIC. The control apparatus 1 may be integrated into the base station 2.

First Example Embodiment

An example configuration of a radio communication system pertaining to this example embodiment may be the same as the example shown in FIG. 1. This example embodiment provides an example of the operation performed by the control apparatus 1.

Figure 2:
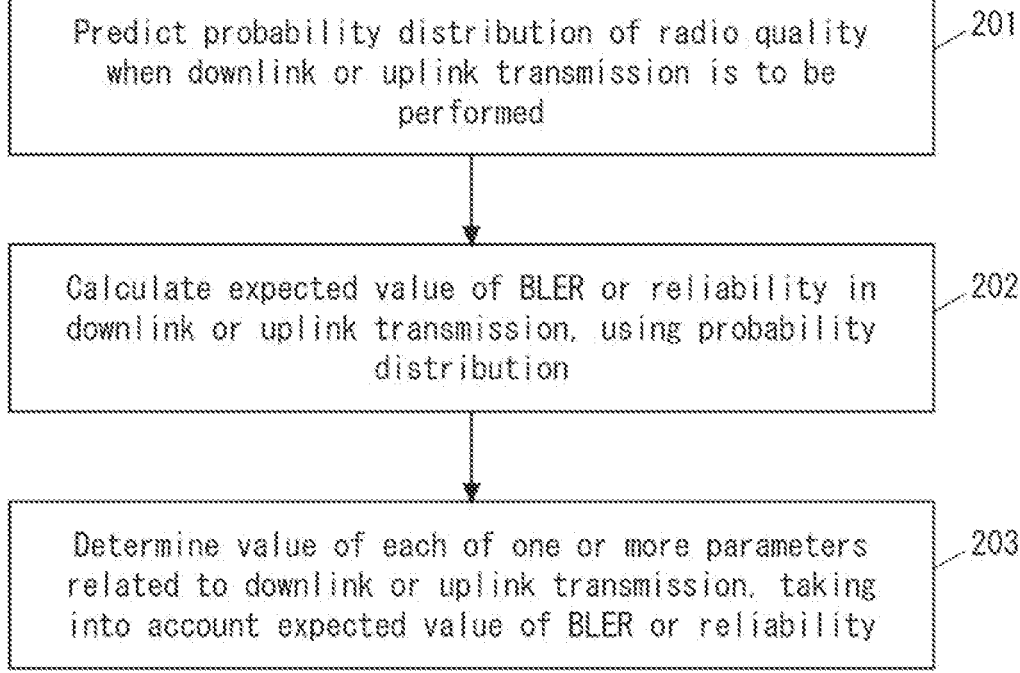
FIG. 2 is a flowchart showing an example of an operation of a control apparatus according to an example embodiment.

FIG. 2 shows a flowchart of an example of the operation of the control apparatus 1. In step 201, the control apparatus 1 predicts a probability distribution of radio quality when a downlink transmission from the base station 2 to the radio terminal 3 or an uplink transmission from the radio terminal 3 to the base station 2 is to be performed.

The radio quality may be SINR, SNR, SIR, or Reference Signal Received Quality (RSRQ). In the case of downlink, the radio quality may be or be based on the reception quality at the radio terminal 3 of a downlink CSI-related reference signal transmitted from the base station 2. In the case of the uplink, the radio quality may be or be based on the reception quality at the base station 2 of an uplink CSI-related reference signal transmitted from the radio terminal 3. If the base station 2 and the radio terminal 3 are a gNB (or gNB-CU or gNB-DU) and a UE in a 5G system, the downlink CSI-related reference signal may be a CSI Reference Signal (CSI-RS) or Synchronization Signal (SS), while the uplink CSI-related reference signal may be a Sounding Reference Signal (SRS).

The probability distribution of radio quality can also be called the probability density function (PDF) of radio quality. The control apparatus 1 may collect a time series of radio quality data from the base station 2 and calculate, determine, or derive the probability distribution of radio quality on this basis. In some implementations, the control apparatus 1 may perform inference based on artificial intelligence (AI) or machine learning (ML) to obtain the probability distribution or probability density function of the radio quality. AI/ML inference refers to a prediction or decision based on a trained machine learning model. The control apparatus 1 may use a time series of radio quality data as input data to the trained learning model for inference execution. The control apparatus 1 may generate the input data supplied to the trained machine learning model from the time series of radio quality data.

The control apparatus 1 may train a machine learning model. Alternatively, a device or computer system (e.g., Non Real time RIC) different from the control apparatus 1 may train the machine learning model and supply the trained machine learning model (i.e., trained parameters) to the control apparatus 1.

The probability distribution of radio quality is affected by various factors. These factors include, for example, the model or type of the radio terminal 3, the speed of movement of the radio terminal 3, interference conditions at the radio terminal 3, presence of obstacles, time interval between transmissions of CSI-related reference signals, frequency density of transmission resources for CSI-related reference signals, time interval between transmissions of CSI reporting, whether beamforming is used, time interval between transmissions of demodulation-related reference signals, frequency density of transmission resources for demodulation-related reference signals, and whether Multi-Input Multi-Output (MIMO) is used. These factors may be further considered in training the machine learning model. The control apparatus 1 may use these factors as input data to the trained learning model to obtain the probability distribution of radio quality from the trained learning model. The demodulation-related reference signals are used to demodulate transmitted signals at the receiver. In other words, the demodulation-related reference signals are used for channel estimation. If the base station 2 and the radio terminal 3 are a gNB (or gNB-CU or gNB-DU) and a UE in a 5G system, the demodulation-related reference signals may be demodulation RS (DMRS).

In step 202, the control apparatus 1 calculates an expected value of a BLER or reliability in the downlink or uplink transmission using the predicted probability distribution of radio quality. The BLER expected value can be derived by integral calculations using a probability density function of radio quality (e.g., SINR) and a BLER versus radio quality (e.g., SINR) curve. For example, when the SINR probability density function is p(s) and the BLER versus SINR curve is e(s), the expected value of the BLER is obtained by the following integral:

$$\int_{-\infty}^{\infty} p(s)e(s)ds \tag{I}$$

The reliability refers to the reliability of communication. The reliability may be defined as 1-BLER. In this case, the reliability expected value can be obtained, for example, by subtracting the expected value of the BLER from 1. Alternatively, for example, the reliability expected value can be derived by an integral calculation using the probability density function of the radio quality (e.g., SINR) and a reliability versus radio quality (e.g., SINR) curve. The BLER can be said to be the probability that data (or a data packet, or a transport block) cannot be successfully transmitted in a given number of retransmissions. Conversely, the reliability can be said to be the probability that data can be successfully transmitted in a given number of retransmissions.

The BLER versus radio quality curve may be stored in memory within the control apparatus 1 or in external memory accessible by the control apparatus 1. The BLER versus radio quality curve may be obtained by a curve fitting method using the results of SINR and BLER measurements. Alternatively, the BLER versus radio quality curve may be obtained by machine learning or deep learning considering the results of SINR and BLER measurements and other factors.

In step 203, the control apparatus 1 determines the value of each of one or more parameters related to the downlink or uplink transmission, taking into account the calculated BLER or reliability expected value. The control apparatus 1 may determine the value of each of the one or more parameters related to the downlink or uplink transmission, taking into account a communication quality requirement imposed on the downlink or uplink transmission. More specifically, the control apparatus 1 may determine the value of each of one or more parameters so that the downlink or uplink transmission is expected to satisfy the communication quality requirement. The control apparatus 1 may determine a plurality of parameters together that affect the achievement of the communication quality requirement, in other words, that are correlated with the communication requirement. In this case, the control apparatus 1 may mutually adjust the values of the plurality of parameters so that the communication quality requirement is satisfied.

The communication quality requirement may include a BLER or reliability requirement, which may specify a target value for the BLER (e.g., $10^{-2}$, $10^{-3}$) or a target value for the reliability (e.g., 99%, 99.9%).

Additionally or alternatively, the communication quality requirement may include a delay requirement. The delay requirement may be called a delay constraint or delay budget. The delay requirement may specify the delay allowed for end-to-end communication at the application layer. Alternatively, the delay requirement may specify the delay allowed for downlink or uplink transmission at the radio layer. The allowable delay at the radio layer may be derived from the allowable delay for end-to-end communication at the application layer.

The communication quality requirement may be changed or updated dynamically. Changes or updates to the communication quality requirement may be based on a request from an application (or application layer). For example, assuming a use case where the radio terminal 3 is mounted on an AGV, the delay requirement demanded by the application could vary depending on the moving speed of the AGV on which the radio terminal 3 is mounted. The delay requirement could also vary depending on the distance between the AGV with the radio terminal 3 and other AGVs.

The control apparatus 1 may consider other factors, such as the radio load of the base station (in other words, the utilization rate of radio resources), when determining the value(s) of the one or more parameters. For example, if the radio resource utilization rate is temporarily high, the control apparatus 1 may temporarily relax the target value for the reliability. Conversely, if the radio resource utilization rate is temporarily low, the control apparatus 1 may temporarily tighten the target value for the reliability. This contributes to ensuring that the long-term average of the reliability can satisfy a given target value of the reliability.

Figure 3:
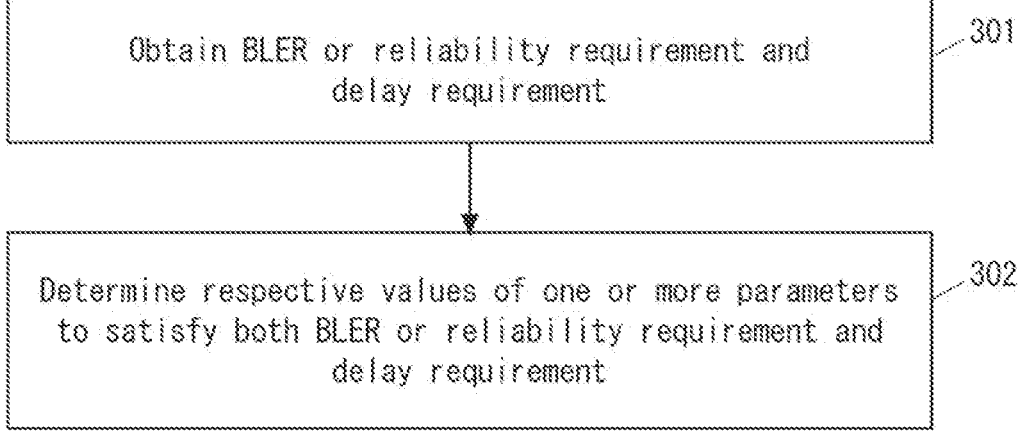
FIG. 3 is a flowchart showing an example of an operation of a control apparatus according to an example embodiment.

FIG. 3 shows an example of the process in step 203 of FIG. 2. In step 301, the control apparatus 1 obtains a BLER or reliability requirement and a delay requirement. These communication quality requirements may be stored in memory within the control apparatus 1 or in external memory accessible by the control apparatus 1. The control apparatus 1 may communicate with any application, device or computer system (e.g., Non Real time RIC) to obtain part or all of these communication quality requirements.

In step 302, the control apparatus 1 determines respective values of one or more parameters to satisfy both the BLER or reliability requirement and the delay requirement.

In the examples in FIG. 2 and FIG. 3, the one or more parameters may include a Modulation and Coding Scheme (MCS) for adaptive modulation coding. The MCS may be represented with an MCS index. The MCS or MCS index represents a combination of a modulation order (or modulation method) and a code rate. The larger the MCS or MCS index, the larger the modulation order and the larger the code rate. Thus, for a given radio quality (e.g., SINR) or channel state, a larger MCS index will increase the radio resource utilization efficiency, but on the other hand, it will increase the BLER.

Additionally or alternatively, the one or more parameters may include a maximum number of retransmissions. The maximum number of retransmissions may be the maximum number of hybrid automatic repeat request (HARQ) retransmissions at the MAC sublayer. The higher the number of retransmissions, the smaller the BLER, but on the other hand, the higher the delay.

Additionally or alternatively, the one or more parameters may include a parameter indicating whether or not packet duplication is used. For LTE and 5G systems, packet duplication may be the duplication of a packet (i.e., PDCP Protocol Data Unit (PDU)) at the PDCP layer, in carrier aggregation or for dual-connectivity split bearers. The use of packet duplication contributes to lower BLER or higher reliability. On the other hand, the use of packet duplication reduces radio resource utilization efficiency.

Additionally or alternatively, the one or more parameters may include one or both of the number of MIMO layers and a parameter indicating whether Single-User (SU) MIMO or Multi-User (MU) MIMO is to be used. The number of MIMO layers may be referred to as the number of MIMO transmission layers, the number of spatial multiplexes, or the number of spatial streams. In general, the greater the number of MIMO layers or spatial streams, the more likely interference is to occur. Interference is also more likely to occur in MU-MIMO than in SU-MIMO.

Additionally or alternatively, the one or more parameters may include one or both of the time interval between transmissions and frequency density of downlink reference signals (e.g., CSI-RS or DMRS or both) by the base station 2. Additionally or alternatively, the one or more parameters may include the time interval between transmissions of channel state reporting (e.g., CSI reports) by the radio terminal 3. Additionally or alternatively, the one or more parameters may include one or both of the time interval between transmissions and frequency density of uplink reference signals (e.g., SRS or DMRS or both) by the radio terminal 3. The time interval between transmissions may be called or replaced by the frequency of transmissions, the pattern of transmissions, or the transmission period. The frequency density of the downlink or uplink reference signals is the frequency density of the reference signal resources and depends on the frequency placement of the reference signal resources. The frequency density of reference signal resources may be defined as the number of reference signal resources (e.g., Resource Elements (REs))

per given set of frequency resources (e.g., Physical Resource Block (PRB)). The time interval between transmissions and frequency density of the downlink or uplink reference signals may be collectively referred to as the time-frequency density or transmission frequency of the downlink or uplink reference signals. Increasing the transmission frequency (or time-frequency density) of the reference signal or the transmission frequency of the CSI reports contributes to reducing the statistical variability (i.e., standard deviation and variance) of the SINR probability distribution. On the other hand, increasing the transmission frequency of the reference signals or that of the CSI reports increases the consumption of radio and computational resources.

Additionally or alternatively, the one or more parameters may include subcarrier spacing. The larger the subcarrier spacing, the greater the effect of diversity in the frequency direction, which tends to reduce the effective SINR variation. In addition, the larger the subcarrier spacing, the lower the delay. On the other hand, the smaller the subcarrier spacing, the more efficient the frequency utilization. The selection of a subcarrier spacing may be done by selecting a Bandwidth Part (BWP).

As described above, the control apparatus 1 may mutually adjust the values of multiple parameters so that one or more communication quality requirements (e.g., BLER or reliability requirement and delay requirement) are satisfied. Some examples are given in the following.

The control apparatus 1 may adjust the MCS applied to each link depending on whether packet duplication is used and the number of redundant links over which the duplicated packets are transmitted. For example, if a BLER of 0.01 or less can achieve the delay requirement requested by an application, then the control apparatus 1 may adjust the MCS applied to each of the two redundant links so that the BLER for each link is 0.1 or less. The control apparatus 1 may increase the MCS index of the link of the cell or base station with the higher load, while decreasing the MCS index of the link of the cell or base station with the lower load. This can contribute to balancing the load of the two cells or base stations while maintaining the probability of achieving the delay requirements by the two links.

The control apparatus 1 may adjust the MCS according to the transmission frequency of the reference signals or CSI reports. For example, increasing the frequency of CSI-RS transmissions in the downlink and increasing the frequency of CSI reports from the radio terminal 3 to the base station can improve the certainty of the predicted SINR. Accordingly, in this case, the control apparatus 1 can increase the MCS index to achieve the BLER and delay requirements. The control apparatus 1 may consider the increase in downlink resource usage efficiency by increasing the MCS index and the decrease in the downlink resource usage efficiency by increasing the frequency of reference signal transmissions.

In the operation described with reference to FIG. 2 and FIG. 3, the control apparatus 1 predicts a probability distribution or probability density function of radio quality (e.g., SINR) when a downlink or uplink transmission takes place, and determines the value(s) of one or more parameters (e.g., MCS index) related to the downlink or uplink transmission using the predicted probability distribution or probability density function. In other words, the control apparatus 1 takes into account expected statistical variations in the radio quality when determining the value(s) of one or more parameters related to the downlink or uplink transmissions. This can contribute to improving the accuracy of estimating the expected value of the BLER or reliability, and can contribute to improving the likelihood that the parameters selected or determined based on the results of radio quality measurements will achieve the target communication quality (e.g., target BLER).

Second Example Embodiment

An example configuration of a radio communication system pertaining to this example embodiment may be the same as the example shown in FIG. 1. This example embodiment provides a detailed example of the operation of the control apparatus 1 described in the first example embodiment.

In this example embodiment, the control apparatus 1 obtains multiple expected values of a BLER or reliability corresponding respectively to different candidate values of a first parameter related to downlink or uplink transmission. The control apparatus 1 then selects the value of the first parameter to be applied to the downlink or uplink transmission, from among one or more candidate values corresponding to one or more BLER or reliability expected values that satisfy a BLER or reliability requirement. The first parameter may include an MCS (or MCS index). The first parameter may further include one or both of a maximum number of retransmissions and a parameter indicating whether or not packet duplication is used. The first parameter may include parameters other than these.

The following is a more detailed description of the operation of the control apparatus 1. FIG. 4 is a flowchart showing an example of the operation of the control apparatus 1. In the example of FIG. 4, the first parameter includes at least an MCS.

In step 401, the control apparatus 1 predicts an SINR probability density function when a downlink transmission from the base station 2 to the radio terminal 3 or an uplink transmission from the radio terminal 3 to the base station 2 is to be performed. The method for obtaining the SINR probability density function may be similar to any of the methods described for step 201 in FIG. 2 in the first example embodiment.

In step 402, using the SINR probability density function along with a plurality of BLER versus SINR curves corresponding to a plurality of MCS candidate values, the control apparatus 1 calculates a plurality of BLER or reliability expected values for the plurality of MCS candidate values. The expected value of the BLER or reliability regarding each MCS candidate value can be derived by an integral calculation using the SINR probability density function and the BLER versus SINR curve that corresponds to the MCS candidate value in question.

As described with respect to the first example embodiment, the multiple BLER versus SINR curves may be stored in memory within the control apparatus 1 or in external memory accessible by the control apparatus 1. Each BLER versus SINR curve may be obtained by a curve fitting technique using SINR and BLER measurements for each MCS. Alternatively, each BLER versus SINR curve may be obtained by machine learning or deep learning that takes into account SINR and BLER measurements for each MCS and other factors.

In step 403, the control apparatus 1 selects from among one or more MCS candidate values corresponding to one or more BLER or reliability expected values that satisfy a BLER or reliability requirement, the MCS value to be applied to the downlink or uplink transmission. The control apparatus 1 may further consider other communication quality requirements, e.g., a delay requirement. The control apparatus 1 may choose the MCS value to be applied to the downlink or uplink transmission to satisfy both the BLER or reliability requirement and the delay requirement.

Figure 5:
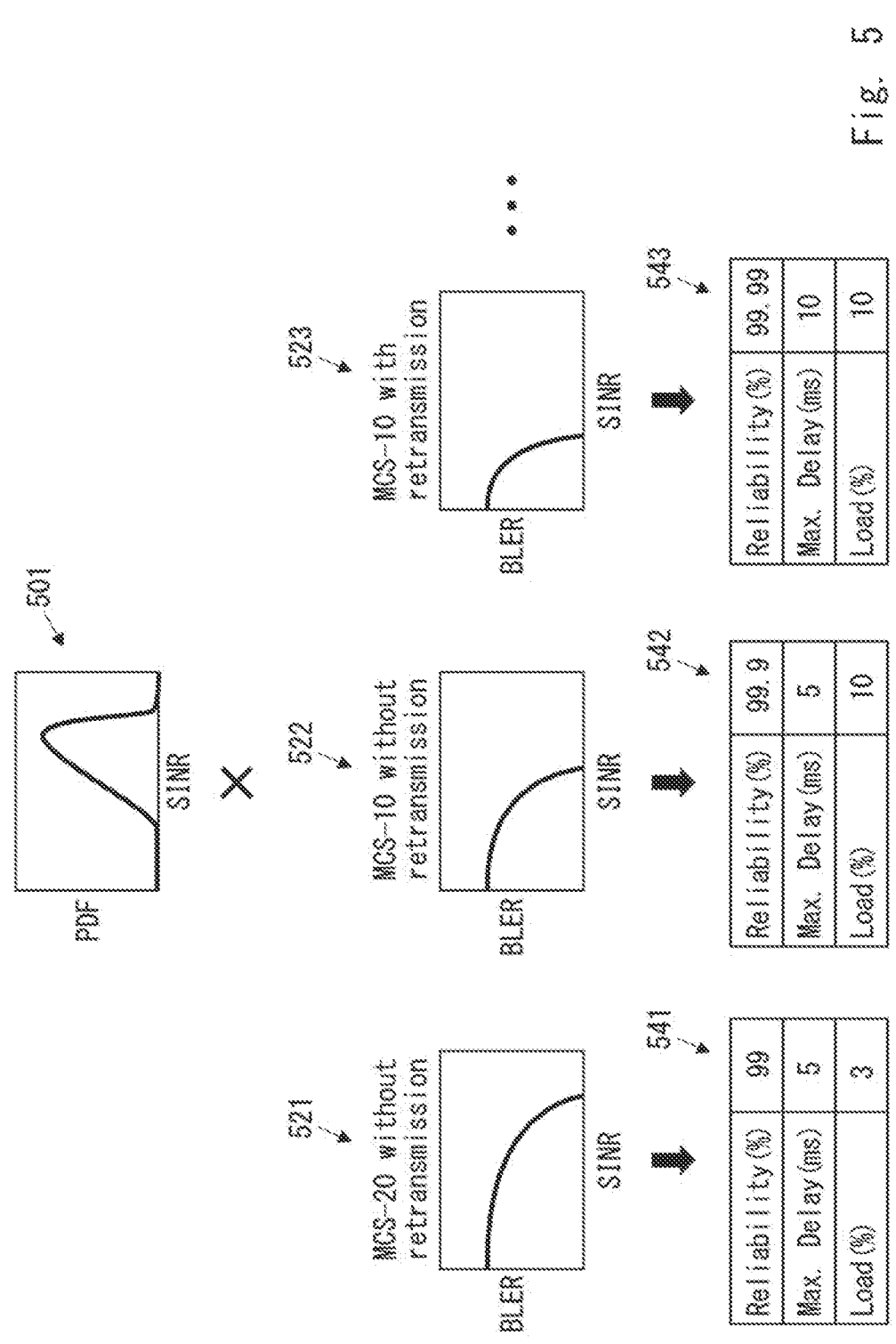
FIG. 5 is a diagram for illustrating an example of an operation of a control apparatus according to an example embodiment.

FIG. 5 illustrates a specific example of the operation described in FIG. 4. The control apparatus 1 predicts an SINR probability density function 501 when a downlink or uplink transmission is to be made. This corresponds to step 401 in FIG. 4. Then, the control apparatus 1 uses the SINR probability density function 501 and multiple BLER versus SINR curves 521, 522, and 523, obtaining results 541, 542, and 543 including multiple reliability expected values. As already explained, a reliability expected value can be calculated by subtracting a BLER expected value from 1.

The BLER versus SINR curves 521, 522, and 523 are associated with different combinations of the MCS index and the maximum number of retransmissions from each other. That is, in the example in FIG. 5, the first parameter includes the MCS and the maximum number of retransmissions. Specifically, the BLER versus SINR curve 521 is for the case where MCS index #20 (MCS-20) is used and no retransmissions are made (i.e., the maximum number of retransmissions is 0). The BLER versus SINR curve 522 is for when MCS index #10 (MCS-10) is used and no retransmissions are made. The BLER versus SINR curve 523 is that when MCS index #10 (MCS-10) is used and one retransmission is performed.

The result 541 includes the reliability expected value that has obtained using the BLER versus SINR curve 521. The result 542 includes the reliability expected value that has obtained using the BLER versus SINR curve 522. The result 543 includes the reliability expected value that has obtained using the BLER versus SINR curve 523. As an example, if a reliability requirement imposed on a downlink or uplink transmission is equal to or greater than 99.9%, the control apparatus 1 may select MCS index #10 (MCS-10) for the downlink or uplink transmission.

In the example in FIG. 5, each of the results 541, 542, and 543 further indicates a maximum delay and radio load. If a delay requirement is further imposed on the downlink or uplink transmission, the control apparatus 1 may select, in determining the MCS index to be applied, an MCS, or a combination of MCS and maximum number of retransmissions, for which the maximum delay meets the delay requirement. If there are multiple candidate MCS values that satisfy the communication quality requirement(s) (e.g., reliability and delay requirements), the control apparatus 1 may determine the MCS to be applied to the downlink or uplink transmissions so that the radio load at the base station 2 is reduced.

Similar to the first example embodiment, in this example embodiment, the control apparatus 1 predicts a probability density function of radio quality (e.g., SINR) when a downlink or uplink transmission is to be made, and determines the value(s) of one or more parameters (e.g., MCS index) related to the downlink or uplink transmission using the predicted probability density function. In other words, the control apparatus 1 takes into account expected statistical variations in the radio quality when determining the value(s) of one or more parameters related to the downlink or uplink transmissions. This can contribute to improving the accuracy of estimating the expected value of the BLER or reliability, and can contribute to improving the likelihood that the parameters selected or determined based on the results of radio quality measurements will achieve the target communication quality (e.g., target BLER).

Third Example Embodiment

An example configuration of a radio communication system pertaining to this example embodiment may be the same as the example shown in FIG. 1. This example embodiment provides a detailed example of the operation of the control apparatus 1 described in the first example embodiment.

In this example embodiment, the control apparatus 1 obtains multiple radio quality probability distributions (or probability density functions) corresponding to different candidate values of a second parameter related to a downlink or uplink transmission. In addition, the control apparatus 1 calculates multiple expected values of a BLER or reliability corresponding respectively to these multiple probability distributions (or probability density functions). The control apparatus 1 then selects the value of the second parameter to be applied to the downlink or uplink transmission, from among one or more candidate values corresponding to one or more BLER or reliability expected values that satisfy a BLER or reliability requirement. The second parameter may include one or any combination of: the number of MIMO layers; a parameter indicating whether SU-MIMO or MU-MIMO is used; a time interval between transmissions of downlink reference signals by the base station 2; a time interval between transmissions of channel state reporting by the radio terminal 3; a time interval between transmissions of uplink reference signals by the radio terminal 3; and a subcarrier spacing.

The following is a more detailed description of the operation of the control apparatus 1. FIG. 6 is a flowchart showing an example of the operation of the control apparatus 1. In the example in FIG. 6, the second parameter includes at least the number of MIMO layers.

In step 601, the control apparatus 1 predicts multiple SINR probability density functions corresponding respectively to different candidate values of the number of MIMO layers. The method for obtaining each SINR probability density function may be similar to any of the methods described for step 201 in FIG. 2 in the first example embodiment.

In step 602, the control apparatus 1 uses the multiple SINR probability density functions and a BLER versus SINR curve, calculating multiple expected values of a BLER or reliability for the multiple candidate values of the number of MIMO layers. The BLER or reliability expected value for each candidate value of the number of MIMO layers can be derived by an integral calculation using the BLER versus SINR curve and the SINR probability density function corresponding to the candidate value of the number of MIMO layers in question.

In step 603, the control apparatus 1 selects the value of the number of MIMO layers to be applied to the downlink or uplink transmission, from among one or more candidate values of the number of MIMO layers corresponding to one or more BLER or reliability expected values that satisfy a BLER or reliability requirement. The control apparatus 1 may further consider other communication quality requirements, e.g., a delay requirement. The control apparatus 1 may choose the value of the number of MIMO layers to be applied to the downlink or uplink transmission to satisfy both the BLER or reliability requirement and the delay requirement.

Figure 7:
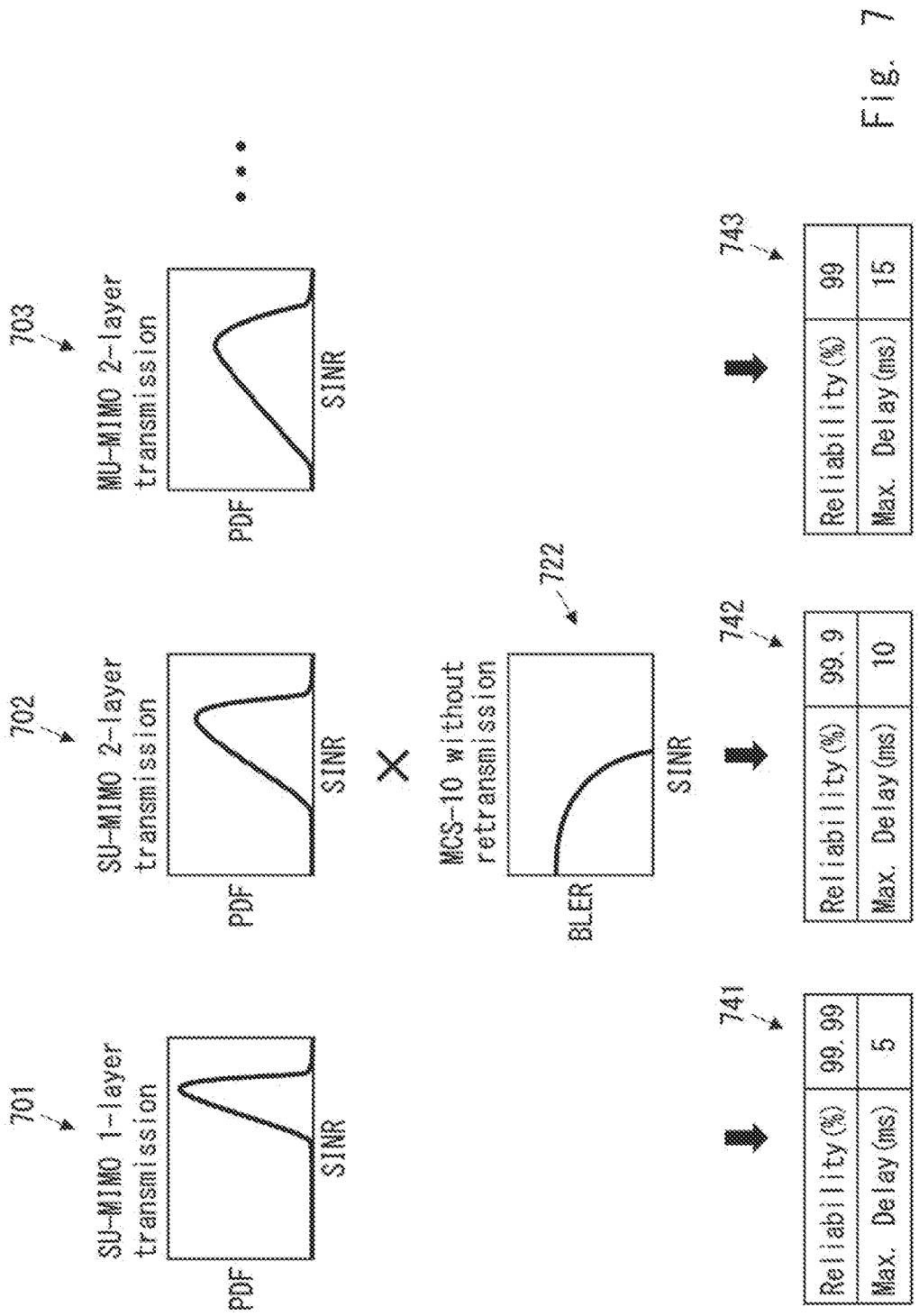
FIG. 7 is a diagram for illustrating an example of an operation of a control apparatus according to an example embodiment.

FIG. 7 illustrates a specific example of the operation described in FIG. 6. The control apparatus 1 predicts SINR probability density functions 701, 702, and 703 when a downlink or uplink transmission is to be performed. This corresponds to step 601 in FIG. 6. The SINR probability density functions 701, 702, and 703 are associated with different combinations of the number of MIMO layers and the choice between SU-MIMO or MU-MIMO, from each other. That is, in the example in FIG. 7, the second parameter includes the number of MIMO layers and a parameter indicating whether SU-MIMO or MU-MIMO is used.

Specifically, the SINR probability density function 701 is for the case where SU-MIMO is used and the number of transmit layers is 1. The SINR probability density function 702 is for the case where SU-MIMO is used and the number of transmission layers is 2. The SINR probability density function 703 is for the case where MU-MIMO is used and the number of transmission layers (or spatial streams) is 2. In general, the greater the number of MIMO layers or spatial streams, the more likely interference is to occur. Interference is also more likely to occur in MU-MIMO than in SU-MIMO. Thus, the SINR probability density function 701 tends to have less statistical variation (i.e., variance and standard deviation) than the other two probability density functions 702 and 703. On the other hand, the SINR probability density function 703 tends to have more statistical variation (i.e., variance and standard deviation) than the other two probability density functions 701 and 702.

The control apparatus 1 then obtains results 741, 742, and 743, including multiple reliability expected values, using the multiple SINR probability density functions 701, 702, and 703 and a BLER versus SINR curve 722. As already explained, a reliability expected value can be calculated by subtracting a BLER expected value from 1. The result 741 includes the reliability expected value obtained using the SINR probability density function 701. The result 742 includes the reliability expected value obtained using the SINR probability density function 702. The result 743 includes the reliability expected value obtained using the SINR probability density function 703. As an example, if a reliability requirement imposed on a downlink or uplink transmission is equal to or greater than 99.9%, the control apparatus 1 may select SU-MIMO and single layer transmission, or SU-MIMO and dual layer transmission, for the downlink or uplink transmission.

In the example in FIG. 7, each of the results 741, 742, and 743 further indicates maximum delay. If a delay requirement is further imposed on the downlink or uplink transmission, the control apparatus 1 may select a combination for which the maximum delay meets the delay requirement. In general, it is known that for uplink transmission by the radio terminal 3, the smaller the number of transmission layers, the better the delay performance, and that SU-MIMO has better delay performance than MU-MIMO. For example, if the reliability requirement is equal to or greater than 99.9% and the delay requirement is less than 5 ms, the control apparatus 1 may select SU-MIMO and single layer transmission for the downlink or uplink transmission.

Similar to the first example embodiment, in this example embodiment, the control apparatus 1 predicts a probability density function of radio quality (e.g., SINR) when a downlink or uplink transmission is to be made, and determines the value(s) of one or more parameters (e.g., MCS index) related to the downlink or uplink transmission using the predicted probability density function. In other words, the control apparatus 1 takes into account expected statistical variations in the radio quality when determining the value(s) of one or more parameters related to the downlink or uplink transmissions. This can contribute to improving the accuracy of estimating the expected value of the BLER or reliability, and can contribute to improving the likelihood that the parameters selected or determined based on the results of radio quality measurements will achieve the target communication quality (e.g., target BLER).

Fourth Example Embodiment

An example configuration of a radio communication system pertaining to this example embodiment may be the same as the example shown in FIG. 1. This example embodiment provides a detailed example of the operation of the control apparatus 1 described in the first example embodiment.

From the above description, one skilled in the art will understand that the methods described in the second example embodiment can be combined with the methods described in the third example embodiment. This example embodiment provides a specific example of such a combination.

FIG. 8 is a flowchart showing an example of the operation of the control apparatus 1. In the example of FIG. 8, a first parameter for a downlink or uplink transmission includes at least an MCS (or MCS index). Furthermore, in the example of FIG. 8, a second parameter for the downlink or uplink transmission includes at least the number of MIMO layers.

In step 801, the control apparatus 1 predicts multiple SINR probability density functions corresponding respectively to different candidate values of the number of MIMO layers. The method for obtaining each SINR probability density function may be similar to any of the methods described for step 201 in FIG. 2 in the first example embodiment.

In step 802, control apparatus 1 calculates multiple expected values of a BLER or reliability for different combinations of a candidate value of the number of MIMO layers and an MCS candidate value. In these calculations, the control apparatus 1 uses multiple SINR probability density functions, along with multiple BLER versus SINR curves corresponding respectively to the multiple MCS candidate values. The BLER or reliability expected value for each combination of a candidate value of the number of MIMO layers and an MCS candidate value can be derived by an integral calculation using the BLER versus SINR curve corresponding to the MCS candidate value in question and the SINR probability density function corresponding to the candidate value of the number of MIMO layers in question.

In step 803, the control apparatus 1 selects the value of the number of MIMO layers and the MCS value to be applied to the downlink or uplink transmission, from among one or more combinations of a candidate value of the number of MIMO layers and an MCS candidate value corresponding to one or more BLER or reliability expected values that satisfy a BLER or reliability requirement. The control apparatus 1 may further consider other communication quality requirements, e.g., a delay requirement. The control apparatus 1 may choose the value of the number of MIMO layers and the MCS value to satisfy both the BLER or reliability requirement and the delay requirement.

Figure 9:
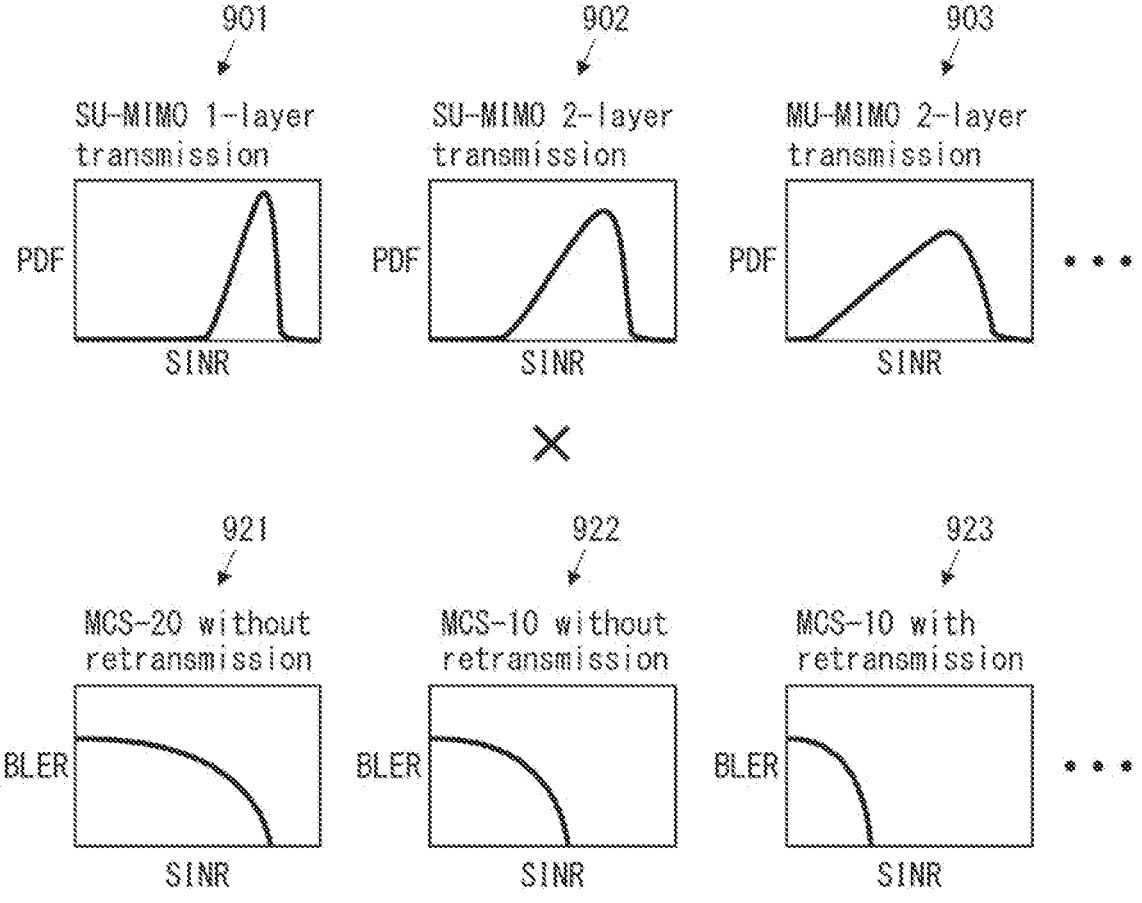
FIG. 9 is a diagram for illustrating an example of an operation of a control apparatus according to an example embodiment.

FIG. 9 illustrates a specific example of the operation described in FIG. 8. The control apparatus 1 predicts SINR probability density functions 901, 902, and 903 when a downlink or uplink transmission is to be performed. This corresponds to step 801 in FIG. 8. The SINR probability density functions 901, 902, and 903 are associated with different combinations of the number of MIMO layers and the choice between SU-MIMO or MU-MIMO, from each other. That is, in the example in FIG. 9, the second parameter includes the number of MIMO layers and a parameter indicating whether SU-MIMO or MU-MIMO is used.

Specifically, the SINR probability density function 901 is for the case where SU-MIMO is used and the number of transmit layers is 1. The SINR probability density function 902 is for the case where SU-MIMO is used and the number of transmission layers is 2. The SINR probability density function 903 is for the case where MU-MIMO is used and the number of transmission layers (or spatial streams) is 2.

The control apparatus 1 then calculates multiple BLER or reliability expected values for different combinations of the first and second parameters using the multiple SINR probability density functions 901, 902, and 903 and multiple BLER versus SINR curves 921, 922, and 923. In the example in FIG. 9, the control apparatus 1 may calculate nine BLER or reliability expected values for nine different parameter combinations. The control apparatus 1 chooses the value of the number of MIMO layers and the value of the MCS that can satisfy the communication quality requirements (e.g., BLER or reliability and delay requirements).

Similar to the first example embodiment, in this example embodiment, the control apparatus 1 predicts a probability density function of radio quality (e.g., SINR) when a downlink or uplink transmission is to be made, and determines the value(s) of one or more parameters (e.g., MCS index) related to the downlink or uplink transmission using the predicted probability density function. In other words, the control apparatus 1 takes into account expected statistical variations in the radio quality when determining the value(s) of one or more parameters related to the downlink or uplink transmissions. This can contribute to improving the accuracy of estimating the expected value of the BLER or reliability, and can contribute to improving the likelihood that the parameters selected or determined based on the results of radio quality measurements will achieve the target communication quality (e.g., target BLER).

Figure 10:
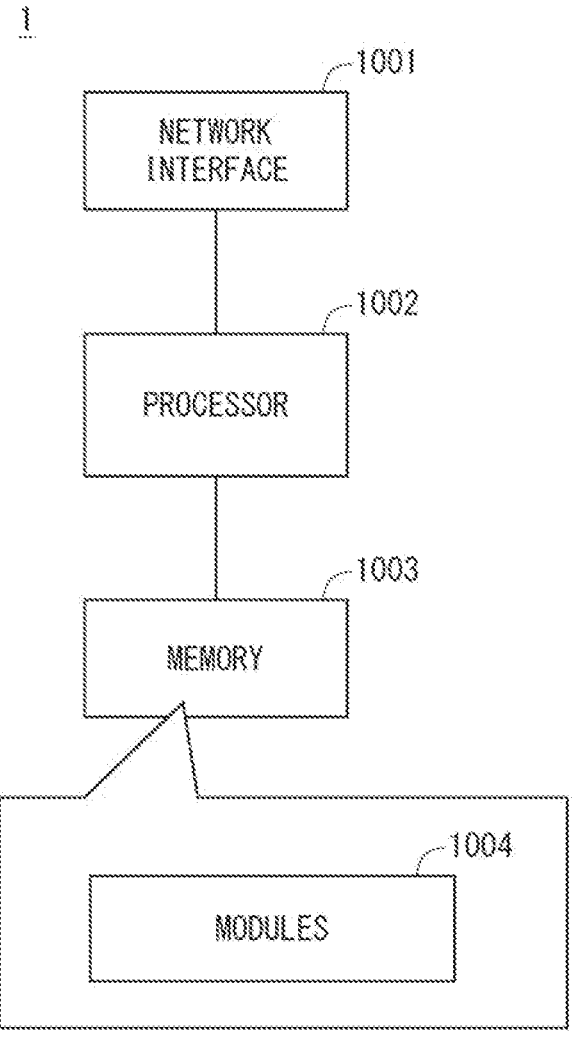
FIG. 10 is a diagram showing an example configuration of a control apparatus according to an example embodiment.

The following provides a configuration example of the control apparatus 1 according to the above-described example embodiments. Referring to FIG. 10, the control apparatus 1 includes a network interface 1001, a processor 1002, and a memory 1003.

The network interface 1001 is used, for example, to communicate with other network elements, functions, or nodes. The network interface 1001 may include, for example, a network interface card (NIC) compliant with the IEEE 802.3 series.

The processor 1002 may be, for example, a microprocessor, a Micro Processing Unit (MPU), or a Central Processing Unit (CPU). The processor 1002 may include a plurality of processors.

The memory 1003 is composed of a volatile memory and a nonvolatile memory. The memory 1003 may include multiple physically independent memory devices. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1003 may include a storage located apart from the processor 1002. In this case, the processor 1002 may access the memory 1003 via the network interface 1001 or an I/O interface.

The memory 1003 may store one or more software modules (computer programs) 1004 including instructions and data to perform the processing of the control apparatus 1 described in the above example embodiments. In some implementations, the processor 1002 may be configured to load the one or more software modules 1004 from the memory 1003 and execute the loaded software modules, thereby performing the processing of the control apparatus 1 described in the above example embodiments.

As explained with FIG. 10, the processor contained in the control apparatus 1 according to the example embodiments described above is able to execute one or more programs containing a set of instructions to cause a computer to perform the algorithm described with reference to the drawings. The program(s) contains a set of instructions (or software codes) that, when loaded into a computer, causes the computer to perform one or more of the functions described in the example embodiments. The program(s) may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray (registered mark) disc or other optical disk storage, magnetic cassettes, magnetic tape, magnetic disk storage or other magnetic storage devices. The program(s) may be transmitted on a transitory computer readable medium or a communication medium. By way of example, and not limitation, transitory computer readable media or communication media can include electrical, optical, acoustical, or other form of propagated signals.

An example advantage according to the above-described example embodiments is to contribute to improving a likelihood that a radio parameter (e.g., MCS) selected or determined based on a measurement result of radio quality can achieve a target communication quality (e.g., target BLER).

The above-described example embodiments are merely examples of the application of the technical ideas obtained by the inventors. These technical ideas are not limited to the above-described example embodiments and various modifications can be made thereto.

The whole or part of the example embodiments disclosed above can be described as, but not limited to, the following supplementary notes.

(Supplementary Note 1)

A control apparatus comprising:

at least one memory; and at least one processor coupled to the at least one memory and configured to:

predict a probability distribution of radio quality when a downlink transmission from a base station to a radio terminal or an uplink transmission from a radio terminal to a base station is to be performed;

calculate an expected value of a block error rate (BLER) or reliability in the downlink or uplink transmission using the probability distribution; and determine a value of each of one or more parameters related to the downlink or uplink transmission, taking into account the expected value.

(Supplementary Note 2)

The control apparatus according to Supplementary Note 1, wherein the at least one processor is configured to consider a BLER or reliability requirement imposed on the downlink or uplink transmission in determining the value of each of the one or more parameters.

(Supplementary Note 3)

The control apparatus according to Supplementary Note 2, wherein the expected value includes a plurality of expected values corresponding to different candidate values of a first parameter included in the one or more parameters, and the at least one processor is configured to select a value of the first parameter from among one or more candidate values corresponding to one or more expected values that satisfy the BLER or reliability requirement.

(Supplementary Note 4)

The control apparatus according to Supplementary Note 3, wherein the first parameter includes a Modulation and Coding Scheme (MCS).

(Supplementary Note 5)

The control apparatus according to Supplementary Note 4, wherein the first parameter further includes one or both of a maximum number of retransmissions and a parameter indicating whether packet duplication is used.

(Supplementary Note 6)

The control apparatus according to any one of Supplementary Notes 2 to 5, wherein the probability distribution includes a plurality of probability distributions corresponding to different candidate values of a second parameter included in the one or more parameters, the expected value includes a plurality of expected values corresponding to the plurality of probability distributions, and the at least one processor is configured to select a value of the second parameter from among one or more candidate values corresponding to one or more probability distributions corresponding to one or more expected values that satisfy the BLER or reliability requirement.

(Supplementary Note 7)

The control apparatus according to Supplementary Note 6, wherein the second parameter includes one or any combination of: a number of Multi-Input Multi-Output (MIMO) layers; a parameter indicating whether Single-User (SU) MIMO or Multi-User (MU) MIMO is used; a time interval between transmissions of downlink reference signals by the base station; a frequency density of the downlink reference signals; a time interval between transmissions of channel state reporting by the radio terminal; a time interval between transmissions of uplink reference signals by the radio terminal; a frequency density of the uplink reference signals; and a subcarrier spacing.

(Supplementary Note 8)

The control apparatus according to any one of Supplementary Notes 2 to 7, wherein the at least one processor is configured to further consider a delay requirement imposed on the downlink or uplink transmission in determining the value of each of the one or more parameters.

(Supplementary Note 9)

The control apparatus according to Supplementary Note 8, wherein the at least one processor is configured to determine the value of each of the one or more parameters to satisfy both the BLER or reliability requirement and the delay requirement.

(Supplementary Note 10)

The control apparatus according to any one of Supplementary Notes 1 to 9, wherein the at least one processor is configured to predict the probability distribution using channel state reporting from the radio terminal.

(Supplementary Note 11)

The control apparatus according to any one of Supplementary Notes 1 to 10, wherein the radio quality includes a signal to interference plus noise ratio (SINR).

(Supplementary Note 12)

The control apparatus according to Supplementary Note 1 or 2, wherein the one or more parameters include a Modulation and Coding Scheme (MCS).

(Supplementary Note 13)

The control apparatus according to Supplementary Note 1 or 2, wherein the one or more parameters include one or both of a number of Multi-Input Multi-Output (MIMO) layers and a parameter indicating whether Single-User (SU) MIMO or Multi-User (MU) MIMO is used.

(Supplementary Note 14)

The control apparatus according to Supplementary Note 1 or 2, wherein the one or more parameters include one or any combination of: a Modulation and Coding Scheme (MCS); a maximum number of retransmissions; a parameter indicating whether packet duplication is used; a number of Multi-Input Multi-Output (MIMO) layers; a parameter indicating whether Single-User (SU) MIMO or Multi-User (MU) MIMO is used; a time interval between transmissions of downlink reference signals by the base station; a frequency density of the downlink reference signals; a time interval between transmissions of channel state reporting by the radio terminal; a time interval between transmissions of uplink reference signals by the radio terminal; a frequency density of the uplink reference signals; and a subcarrier spacing.

(Supplementary Note 15)

The control apparatus according to any one of Supplementary Notes 1 to 14, wherein the control apparatus is located at the base station or a Radio Access Network (RAN) Intelligent Controller (RIC).

(Supplementary Note 16)

A method performed by a control apparatus, comprising:

predicting a probability distribution of radio quality when a downlink transmission from a base station to a radio terminal or an uplink transmission from a radio terminal to a base station is to be performed;

calculating an expected value of a block error rate (BLER) or reliability in the downlink or uplink transmission using the probability distribution; and determining a value of each of one or more parameters related to the downlink or uplink transmission, taking into account the expected value.

(Supplementary Note 17)

A non-transitory computer readable medium storing a program for causing a computer to perform a method, wherein the method comprises:

predicting a probability distribution of radio quality when a downlink transmission from a base station to a radio terminal or an uplink transmission from a radio terminal to a base station is to be performed;

calculating an expected value of a block error rate (BLER) or reliability in the downlink or uplink transmission using the probability distribution; and determining a value of each of one or more parameters related to the downlink or uplink transmission, taking into account the expected value.

The invention claimed is:

1. A control apparatus comprising:
at least one memory; and
at least one processor coupled to the at least one memory and configured to:
   predict a probability distribution of radio quality when a downlink transmission from a base station to a radio terminal, or an uplink transmission from a radio terminal to a base station, is to be performed;
   calculate an expected value of a block error rate (BLER) or reliability in the downlink or uplink transmission using the probability distribution; and
   determine a value of each of one or more parameters related to the downlink or uplink transmission, taking into account the expected value, to satisfy both of:
      the BLER or reliability requirement imposed on the downlink or uplink transmission; and
      a delay requirement imposed on the downlink or uplink transmission.

2. The control apparatus according to claim 1, wherein:
the expected value includes a plurality of expected values corresponding to different candidate values of a first parameter included in the one or more parameters, and
the at least one processor is configured to select a value of the first parameter from among one or more candidate values corresponding to one or more expected values that satisfy the BLER or reliability requirement.

3. The control apparatus according to claim 2, wherein the first parameter includes a Modulation and Coding Scheme (MCS).

4. The control apparatus according to claim 3, wherein the first parameter further includes one or both of a maximum number of retransmissions and a parameter indicating whether packet duplication is used.

5. The control apparatus according to claim 1, wherein:
the probability distribution includes a plurality of probability distributions corresponding to different candidate values of a second parameter included in the one or more parameters,
the expected value includes a plurality of expected values corresponding to the plurality of probability distributions, and
the at least one processor is configured to select a value of the second parameter from among one or more candidate values corresponding to one or more probability distributions corresponding to one or more expected values that satisfy the BLER or reliability requirement.

6. The control apparatus according to claim 5, wherein the second parameter includes one or any combination of: a number of Multi-Input Multi-Output (MIMO) layers; a parameter indicating whether Single-User (SU) MIMO or Multi-User (MU) MIMO is used; a time interval between transmissions of downlink reference signals by the base station; a frequency density of the downlink reference signals; a time interval between transmissions of channel state reporting by the radio terminal; a time interval between transmissions of uplink reference signals by the radio terminal; a frequency density of the uplink reference signals; and a subcarrier spacing.

7. The control apparatus according to claim 1, wherein the at least one processor is configured to predict the probability distribution using channel state reporting from the radio terminal.

8. The control apparatus according to claim 1, wherein the radio quality includes a signal to interference plus noise ratio (SINR).

9. The control apparatus according to claim 1, wherein the one or more parameters include a Modulation and Coding Scheme (MCS).

10. The control apparatus according to claim 1, wherein the one or more parameters include one or both of a number of Multi-Input Multi-Output (MIMO) layers and a parameter indicating whether Single-User (SU) MIMO or Multi-User (MU) MIMO is used.

11. The control apparatus according to claim 1, wherein the one or more parameters include one or any combination of: a Modulation and Coding Scheme (MCS); a maximum number of retransmissions; a parameter indicating whether packet duplication is used; a number of Multi-Input Multi-Output (MIMO) layers; a parameter indicating whether Single-User (SU) MIMO or Multi-User (MU) MIMO is used; a time interval between transmissions of downlink reference signals by the base station; a frequency density of the downlink reference signals; a time interval between transmissions of channel state reporting by the radio terminal; a time interval between transmissions of uplink reference signals by the radio terminal; a frequency density of the uplink reference signals; and a subcarrier spacing.

12. The control apparatus according to claim 1, wherein the control apparatus is located at the base station or a Radio Access Network (RAN) Intelligent Controller (RIC).

13. A method performed by a control apparatus, the method comprising:

predicting a probability distribution of radio quality when a downlink transmission from a base station to a radio terminal, or an uplink transmission from a radio terminal to a base station, is to be performed;

calculating an expected value of a block error rate (BLER) or reliability in the downlink or uplink transmission using the probability distribution; and determining a value of each of one or more parameters related to the downlink or uplink transmission, taking into account the expected value, to satisfy both of:

a BLER or reliability requirement imposed on the downlink or uplink transmission; and a delay requirement imposed on the downlink or uplink transmission.

14. The method according to claim 13, wherein:

the expected value includes a plurality of expected values corresponding to different candidate values of a first parameter included in the one or more parameters, and the determining comprises selecting a value of the first parameter from among one or more candidate values corresponding to one or more expected values that satisfy the BLER or reliability requirement.

15. The method according to claim 14, wherein the first parameter includes a Modulation and Coding Scheme (MCS).

16. A non-transitory computer readable medium storing a program for causing a computer to perform a method, wherein the method comprises:

predicting a probability distribution of radio quality when a downlink transmission from a base station to a radio terminal, or an uplink transmission from a radio terminal to a base station, is to be performed;

calculating an expected value of a block error rate (BLER) or reliability in the downlink or uplink transmission using the probability distribution; and determining a value of each of one or more parameters related to the downlink or uplink transmission, taking into account the expected value, to satisfy both of:

a BLER or reliability requirement imposed on the downlink or uplink transmission; and a delay requirement imposed on the downlink or uplink transmission.

\* \* \* \* \*